June 3, 1958     O. G. SCHWEDE     2,837,006
ANGULAR DISCRIMINATING OPTICAL VIEWING DEVICE
Filed Dec. 30, 1955

INVENTOR.
OTTO G. SCHWEDE
BY
George F. Rubens
ATTORNEYS

United States Patent Office 2,837,006
Patented June 3, 1958

2,837,006

ANGULAR DISCRIMINATING OPTICAL VIEWING DEVICE

Otto G. Schwede, Ventura, Calif.

Application December 30, 1955, Serial No. 556,755

2 Claims. (Cl. 88—1)

(Granted under Title 35, U. S. Code (1952), sec. 266)

The invention described herein may be manufactured and used by or for the Government of the United States of American for governmental purposes without the payment of any royalties thereon or therefor.

This invention relates to a novel angular discriminating optical device and is more particularly concerned with optical devices for reducing glare from lights or from the sun.

This application is a continuation-in-part of co-pending U. S. application Serial No. 292,775 of Otto G. Schwede, filed June 10, 1952 now Patent No. 2,731,872 issued 24 January 1956.

In night driving it has been established that it is generally the scattered light rays of an approaching bright headlight which blind a driver. These light rays, when entering the eye, affect visibility in two ways. First, the weak impressions due to useful reflections from objects ahead of the driver are greatly reduced or eliminated by the powerful direct light transmission from the approaching headlights. Second, the mechanism of the human eye automatically adjusts the pupil of the eye to the total incoming quantity of light, and consequently, an approaching powerful headlight causes automatic contraction of the pupil which is normally wide open during the night, to a very small effective area, with an additional weakening of the useful light impressions as a result. The well known sensation which a blinded driver experiences is that of a black wall with two bright lights in it.

A similar but far weaker effect can be observed during the hours when the sun is near the horizon. The position of the sun, however, is not always directly ahead of the driver, so that he can often protect himself by means of a sun visor. But the principle of the sun visor cannot be applied to night driving because the source of light is almost directly ahead and at nearly the same level as the road, and hence use of a visor would thus eliminate from view a substantial portion of the road which must be observed. An opaque shade or light filter placed before the driver and capable of effective darkening of the disturbing headlights consequently would either darken the driver's own lane to a considerable degree or would not be effective at all.

Moreover, shielding a portion of the driver's field of vision with a screen or filter would have many disadvantageous features. First, a shade which affords a sharp separation between the left and right fields of vision would have to be placed at a great distance in front of the eyes due to the finite diameter of the pupil of the eye. In addition, two members, one extending from the nose, the other from the left temple to the screens would have to be provided. These members would narrow the useful field of vision and function like blinders. Second, the eyes of a driver would always be irritated by these supporting members brought directly into his field of vision. Increased inconvenience and insecurity would be the result.

Various devices have been proposed for reducing glare, particularly in night driving, including devices employing polarized light. However, the majority of such prior art devices have proven unsatisfactory in use.

The present invention employs a transparent prism element having parallel entrance and emergent faces and two planar surfaces disposed at acute angles to the entrance and emergent faces respectively such that a portion of the light rays striking each of the planar surfaces is totally reflected and another portion of the light rays is only partially reflected in accordance with the angles of incidence of the light rays. An optical double layer is disposed contiguous to each of said planar surfaces, said double layer comprising a light filter and a transparent lamina the index of refraction of which is less than that of said prism element.

The angular discriminating device according to the invention as applied particularly to night driving provides a sharp separation between the light rays coming from one side of the road and the light rays coming from the other side thus eliminating the glare from the approaching headlights and retaining full visibility of the driver's lane.

One object of the invention is to provide a new and novel angular discriminating optical device.

Another object is the provision of optical devices for reducing glare from lights or from the sun.

Yet another object of the invention is to afford simple and relatively inexpensive glare reducing or eliminating optical devices which may be worn by a car driver like spectacles, or which may be attached to the windshield of a vehicle, or which may be incorporated in any suitable manner in front of the driver of a vehicle, and through which he may look while operating a car at night or against the sun.

Other objects and many of the attendant advantages of this invention will be readily appreciated as the same becomes better understood by reference to the following detailed description when considered in connection with the accompanying drawings wherein.

Figure 1:
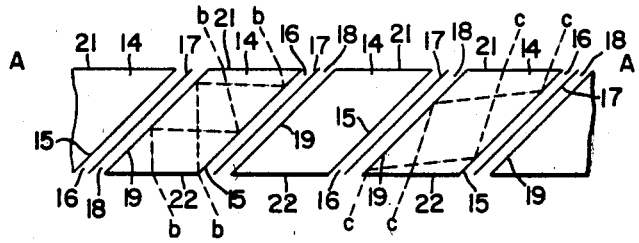
Fig. 1 is a schematic illustration of the invention device.

Referring now to Fig. 1 of the drawing, there is shown a pane or composite series of optical elements A—A composed of a quantity of small transparent prism elements 14. Each of the prism elements has two parallel planar surfaces or faces 15 and 19, and the adjacent faces 15 and 19 of adjacent prisms are separated by two optical double layers 16—17 and 17—18. 16 and 18 are transparent laminae, and 17 is a light absorbing filter. Hence these adjacent optical double layers have a common filter. The entrance faces 21 of prisms 14 are parallel to the emergent or exit faces 22 of the prisms, and it is apparent that surfaces 15 form an acute angle with entrance faces 21, and surfaces 19 from an acute angle with emergent faces 22 of each of the prisms.

Rays entering the entrance face 21 of each prism are reflected by faces 15 and 19 and emerge from exit face 22. The rays c—c coming from the right side of the field of vision are totally reflected at planar surface 15 since their angle of incidence is greater than the critical angle. Rays c—c thereby change their direction, traverse prism 14 and upon striking the second planar surface 19 are again totally reflected, thus restoring their direction prior to the first reflection. The rays finally emerge from exit face 22 with their original direction of incidence.

Rays b—b coming from the left are partially transmitted and partially reflected by the surface 15 since their angle of incidence is less than the critical angle. The transmitted portion of such rays traverses lamina 16 and is then completely absorbed by filter 17. The reflected portion of rays b—b traverses the prism 14 and strikes the second surface 19 where they are again partially transmitted and partially reflected. The transmitted rays are absorbed by filter 17 and the direction of the reflected rays is restored to their direction prior to the first reflection. These reflected rays emerge from the exit face in their original direction of incidence. Because the rays c—c are twice totally reflected, their intensity is practically unchanged, whereas the intensity of rays b—b which were twice only partially reflected is greatly reduced. In this manner angular discrimination is obtained such that light rays emanating in one portion of the field of vision which in this case is the left portion is largely attenuated while like rays emanating from the other portion of the field of vision are substantially unattenuated.

Figure 2:
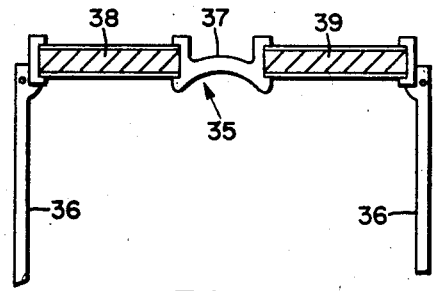
Fig. 2 is a horizontal cross-sectional schematic view of spectacles containing the optical device of Fig. 1.
Figure 3:
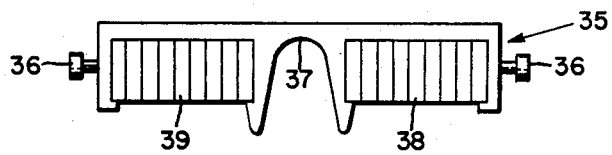
Fig. 3 is a front view of the spectacles shown in Fig. 2.

Figs. 2 and 3 disclose spectacles or eye glasses employing the optical device shown in Fig. 1. Such spectacles include a frame 35 having temple pieces 36 and a nose piece 37. Mounted in the spectacle frame are a pair of co-planar transparent plates 38 and 39. Each of these plates is composed of a series of juxtaposed optical elements of the type shown in Fig. 1. When the spectacles are worn by the driver of an automobile at night, glare rays emanating from approaching headlights at the left are attenuated while light rays directly in front and to the right of the driver are permitted to pass through eye pieces 38 and 39 practically undiminished in intensity. As seen particularly in Fig. 3, the lower rim of the spectacle frame is eliminated and the temple pieces 36 are mounted comparatively low so that when the spectacles are worn, the pupil of the eye is normally located just below the lenses or eye pieces 38 and 39. This enables a driver to wear the spectacles while still allowing him to observe the road directly without looking through the glasses. In the event of the presence of glare rays the wearer may adjust the spectacles merely by a slight tilting of the head to such a position that the glare disappears. In this manner maximum protection and safety with minimum irritation to the eyes is achieved.

Figure 4:
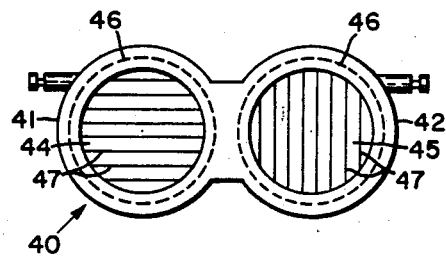
Fig. 4 is another type of spectacles embodying the optical device shown in Fig. 1.

Fig. 4 represents another type of spectacles also embodying the optical device disclosed in Fig. 1. In this embodiment, the eye glass frame 40 is constructed with circular lens holders 41 and 42, each having an annular groove 46 therein. Optical lenses 44 and 45 composed of a series of juxtaposed optical elements as shown in Fig. 1 and circular in shape are mounted in the grooves 46 of the lens holders. The lenses or eye pieces 44 and 45 may be rotated in the grooves of the lens holders in any suitable manner so that the prism elements 47 of the eye pieces may be shifted to any angle from the horizontal as shown in the left eye piece of Fig. 4 to the vertical as shown in the right eye piece of Fig. 4. By means of this embodiment, the spectacles may be worn for night driving to eliminate glare from oncoming headlights by rotating both lenses to the position shown by the right eye piece of Fig. 4, or the spectacles may be used to eliminate glare from a low sun by rotating the lenses to the position shown by the left eye piece of Fig. 4.

As additional applications of the invention device, the latter may be attached to or incorporated as an integral part of the windshield of an automobile or vehicle to protect the driver thereof from glare rays, or the invention device may be positioned in front of the driver in any other suitable manner, e. g., by attachment to the conventional auto visor, for this purpose.

The transparent laminae employed in the invention device may include any media having a refractive index smaller than that of the prisms and larger than that of air. It is also to be understood that the prisms in the invention device may be constructed of materials other than glass. Further, the invention principles are not limited to a half and half division of the field of vision, but may also be utilized to divide the field of vision into more than two parts.

It is apparent from the foregoing that the invention provides a simple optical device for attenuating or substantially eliminating unwanted light rays of one direction while allowing the passage in practically undiminished intensity of desired light rays from a different direction, the device being particularly useful in the form of a glare protector for night operation of an automobile to eliminate glare from headlights of cars approaching in the opposite lane while allowing practically undiminished and unobstructed vision of the highway in the driver's own lane and to his right. Moreover, the glare protection devices hereof may be readily adjusted in a manner to prevent blinding of the driver by a rising or setting sun close to the horizon.

A comparison of the glare protector according to the invention with devices utilizing polarized light further points out the advantages of the invention. In the first place, the operator of an automobile may protect himself from oncoming headlight glare by means of the invention device regardless of whether the approaching car is also equipped with the invention device. Further, the intensity of illumination and the visibility within the driver's own lane are not decreased as in the case of the use of devices employing polarized light, thus eliminating the necessity for the use of stronger light bulbs and power sources. Hence it is apparent that the invention device increases the safety of night driving by providing better vision for the driver and by reducing the strain on his eyes resulting from blinding headlights.

Obviously many modifications and variations of the present invention are possible in the light of the above teachings. It is therefore to be understood that within the scope of the appended claims the invention may be practiced otherwise than as specifically described.

I claim:

1. An angular discriminating optical device which comprises a transparent prism means having an entrance face, an emergent face parallel to and spaced from said entrance face, said prism means also having two parallel spaced planar surfaces connecting corresponding edges of said entrance and emergent faces, one of said planar surfaces being disposed at an acute angle to the entrance face and the other of said planar surfaces being disposed at an acute angle to the emergent face of said prism whereby a portion of the light rays entering the entrance face is totally reflected sequentially by said planar surfaces and a portion of said rays is partially reflected and partially transmitted by said planar surfaces depending on the angle of incidence of said rays, a pair of optical double layers respectively disposed contiguous to said planar surfaces, each of said double layers comprising a light absorption filter and a transparent lamina the index of refraction of which is less than that of said prism means, the lamina of each of said double layers being adjacent to and in continuous contact both with its associated filter and one of said planar surfaces so as to effect total sequential reflection of that portion of said light rays reaching the entrance face of said prism at greater than a predetermined angle of incidence with respect to such face, and to effect partial transmission by said transparent laminae, and subsequent absorption by the filters respectively associated therewith, of that portion of those light rays reaching the entrance face of said prism at less than a predetermined angle of incidence with respect to such face.

2. An optical device comprising a composite series of juxtaposed transparent prisms, each such prism having an entrance face and an emergent face parallel to and spaced from said entrance face, the entrance faces of said juxtaposed prisms lying in a common plane and the emergent faces of said juxtaposed prisms also lying in a common plane parallel to and spaced from said first-mentioned plane, each prism having two spaced planar surfaces connecting corresponding edges of said entrance and emergent faces, the said spaced planar surfaces of each prism being parallel both to each other and to the corresponding planar surfaces of the remainder of said composite series of juxtaposed prisms, one of the planar surfaces of each of said prisms being disposed at an acute angle to the entrance face of said prism and the other of said planar surfaces being disposed at an acute angle to the emergent face of such prism, whereby a portion of the light rays impinging the entrance face is totally reflected sequentially by said two planar surfaces and a portion of said impinging rays is partially reflected and partially transmitted by said two planar surfaces depending upon the angle of incidence of said rays, a pair of optical double layers respectively disposed between the parallel planar surfaces of adjacent prisms, each of said doube layers including a transparent lamina, the index of refraction of which is less than that of said prisms, together with a single light-absorbing medium common to said pair of double layers, the lamina of each of said double layers being respectively adjacent to and in continuous contact both with the said common light-absorbing medium and a planar surface of a different one of the said series of juxtaposed prisms.

References Cited in the file of this patent

UNITED STATES PATENTS

| | | |
|---|---|---|
| 1,458,635 | Whitney | June 12, 1923 |
| 2,240,988 | Hertel | May 6, 1941 |
| 2,447,828 | West | Aug. 24, 1958 |

FOREIGN PATENTS

| | | |
|---|---|---|
| 458,509 | Great Britain | Dec. 14, 1936 |